United States Patent
Wang et al.

(10) Patent No.: US 10,530,552 B2
(45) Date of Patent: *Jan. 7, 2020

(54) WIRELESS COMMUNICATION METHOD AND WIRELESS COMMUNICATION DEVICE

(71) Applicant: PANASONIC INTELLECTUAL PROPERTY CORPORATION OF AMERICA, Torrance, CA (US)

(72) Inventors: Lilei Wang, Beijing (CN); Hidetoshi Suzuki, Kanagawa (JP); Tetsuya Yamamoto, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,876

(22) Filed: Apr. 11, 2019

(65) Prior Publication Data

US 2019/0238297 A1    Aug. 1, 2019

Related U.S. Application Data

(63) Continuation of application No. 15/698,054, filed on Sep. 7, 2017, now Pat. No. 10,305,662, which is a
(Continued)

(51) Int. Cl.
*H04L 5/00* (2006.01)
*H04L 5/02* (2006.01)
(Continued)

(52) U.S. Cl.
CPC ............ *H04L 5/0053* (2013.01); *H04L 5/005* (2013.01); *H04L 5/0051* (2013.01);
(Continued)

(58) Field of Classification Search
CPC ..... H04W 4/022; H04W 4/70; H04W 72/042; H04L 5/005; H04L 5/0051; H04L 5/0053; H04L 5/0064; H04L 5/02; H04L 25/0202
See application file for complete search history.

(56) References Cited

U.S. PATENT DOCUMENTS

| 9,986,444 B2 * | 5/2018 | Kim ....................... H04B 7/024 |
| 2012/0147831 A1 * | 6/2012 | Golitschek ............ H04L 1/0026 370/329 |

(Continued)

FOREIGN PATENT DOCUMENTS

| CN | 104301067 A | 1/2015 |
| WO | 2014/069944 A1 | 5/2014 |

OTHER PUBLICATIONS

International Search Report, dated Jan. 12, 2016, for International Application No. PCT/CN2015/076270, 2 pages.
(Continued)

*Primary Examiner* — Dominic E Rego
(74) *Attorney, Agent, or Firm* — Seed IP Law Group LLP

(57) ABSTRACT

Wireless communication methods and devices are provided. The wireless communication method includes transmitting a reference signal and a data signal in a Physical Resource Block (PRB) with a coverage enhancement level, wherein the number of resource elements transmitting the reference signal in the PRB is determined by the coverage enhancement level, the channel type and/or the coding rate of the data signal.

16 Claims, 3 Drawing Sheets

Related U.S. Application Data continuation of application No. PCT/CN2015/076270, filed on Apr. 10, 2015.

(51) Int. Cl.
*H04W 4/021* (2018.01)
*H04W 4/70* (2018.01)
*H04L 25/02* (2006.01)
*H04W 72/04* (2009.01)

(52) U.S. Cl.
CPC ............. *H04L 5/0064* (2013.01); *H04L 5/02* (2013.01); *H04W 4/022* (2013.01); *H04W 4/70* (2018.02); *H04L 25/0202* (2013.01); *H04W 72/042* (2013.01)

(56) References Cited

U.S. PATENT DOCUMENTS

| | | | | |
|---|---|---|---|---|
| 2013/0003673 A1* | 1/2013 | Dinan | ............... | H04W 72/0406 370/329 |
| 2013/0135984 A1 | 5/2013 | Choi et al. | | |
| 2013/0208678 A1* | 8/2013 | Zhang | ................... | H04L 5/0053 370/329 |
| 2013/0286964 A1* | 10/2013 | Chu | ...................... | H04L 27/261 370/329 |
| 2013/0322376 A1* | 12/2013 | Marinier | ............... | H04W 72/06 370/329 |
| 2014/0064109 A1* | 3/2014 | Krishnamurthy | .... | H04J 11/0053 370/252 |
| 2014/0247778 A1* | 9/2014 | Gomadam | ............ | H04L 5/0051 370/329 |
| 2014/0301300 A1* | 10/2014 | Lunttila | ................. | H04L 1/1812 370/329 |
| 2014/0341146 A1* | 11/2014 | Nakashima | ......... | H04W 72/042 370/329 |
| 2015/0098409 A1* | 4/2015 | Li | ....................... | H04W 72/042 370/329 |
| 2015/0296518 A1 | 10/2015 | Yi et al. | | |
| 2016/0087774 A1* | 3/2016 | Guo | ..................... | H04L 5/0051 370/329 |

OTHER PUBLICATIONS

Extended European Search Report, dated Feb. 23, 2018, for European Application No. 15888177.1-1219/3281444, 11 pages.

NSN, Nokia, "PUSCH Coverage Enhancement," R1-140552, 3GPP TSG-RAN WG1 Meeting #76, Agenda item: 7.2.2.2.4, Prague, Czech Republic, Feb. 10-14, 2014, 2 pages.

* cited by examiner

WIRELESS COMMUNICATION METHOD AND WIRELESS COMMUNICATION DEVICE

BACKGROUND

1. Technical Field

The present disclosure relates to the field of wireless communication, and in particular, to wireless communication methods and wireless communication devices in Machine-Type Communication.

2. Description of the Related Art

MTC (Machine-Type Communication) is a new type of communication in 3GPP (The 3rd Generation Partnership Project) in release 12 and is an important revenue stream for operators and has a huge potential from the operator perspective. Based on the market and operators' requirements, one of the important requirements of MTC is improving the coverage of MTC UEs (User Equipments). Thus, MTC will further be envisioned in release 13, for example, to support coverage enhancement of 15 dB. This type of coverage enhancement technique is quite useful for some MTC UEs such as sensors in the basement which have large losses on their signal strengths due to the penetration losses.

Repetition is one of key techniques to support MTC UEs in coverage enhancement. Specifically, for MTC UEs in coverage enhancement, basically each channel needs to do multiple repetitions (e.g., 100 times). At the receiver side, the receiver combines all the repetitions of the channel and decodes the information. Thus, coverage enhancement requirement is reached by signal accumulation and power enhancement resulting from repetitions.

SUMMARY

One non-limiting and exemplary embodiment provides an approach to maximally optimize the system performance in MTC with coverage enhancement.

In one general aspect, the techniques disclosed here feature a wireless communication method, including: transmitting a reference signal and a data signal in a Physical Resource Block (PRB) with a coverage enhancement level, wherein the number of resource elements transmitting the reference signal in the PRB is determined by the coverage enhancement level, the channel type and/or the coding rate of the data signal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
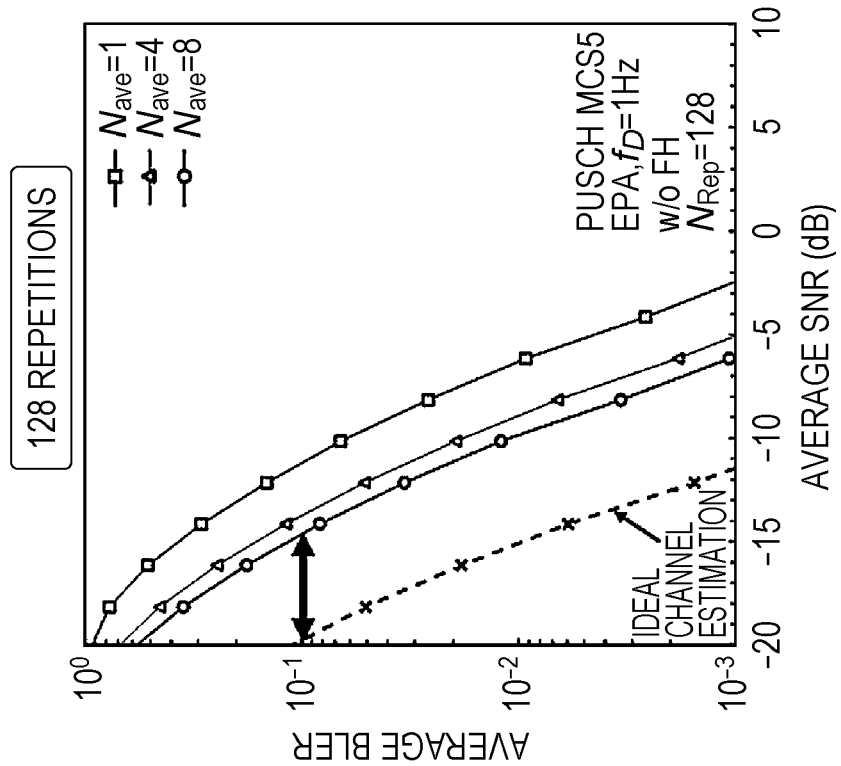
FIGS. 1A and 1B are schematic diagrams each showing an example of BLER performance of PUSCH repetitions.

In the following detailed description, reference is made to the accompanying drawings, which form a part hereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Underlying Knowledge Forming Basis of the Present Disclosure

In the repetition as one key technique of coverage enhancement for MTC as mentioned in the BACKGROUND, long repetitions will last a long time and will ask MTC UEs to keep active for a long time to be always in a reception state, which will largely consume UEs' power and occupy many system resources. Therefore, other coverage enhancement technique such as RS (reference signal) density increase is a useful assistance to realize coverage enhancement to reduce repetition time.

In order to introduce the RS density increase simply, take one PRB (Physical Resource Block) as an example. One PRB consists of 14 symbols in time domain and 12 subcarriers in frequency domain, and one symbol and one subcarrier form one RE (Resource Element). That is to say, one PRB has 12×14 REs in total. It is specified in the standard that some REs are assigned for transmitting some kinds of reference signals and other REs are assigned for transmitting data signals in one PRB. For a certain reference signal in a normal usage case, the number of REs assigned for transmitting it in one PRB and positions thereof are specified in the standard. Thus, the RS density, that is, the ratio of REs for transmitting the reference signal to total REs in one PRB, is specified in the standard. Accordingly, RS density increase means increasing the number of REs for transmitting the reference signal in one PRB.

By increasing the RS density, the channel estimation performance and thus signal quality can be improved, so that repetition times can be reduced for MTC UEs with coverage enhancement.

One straightforward solution to apply RS density increase is that all UEs and all channels assume the maximum RS density, for example 24 CRS (Cell-specific Reference Signal) REs and 24 DMRS (Demodulation Reference Signal) REs per PRB. However, based on our observations, some UEs cannot benefit from RS density increase, but their performance will be impacted. Also, some channels cannot benefit from RS density increase due to impact on the coding rate. The detailed observations are described below.

Figure 1B:
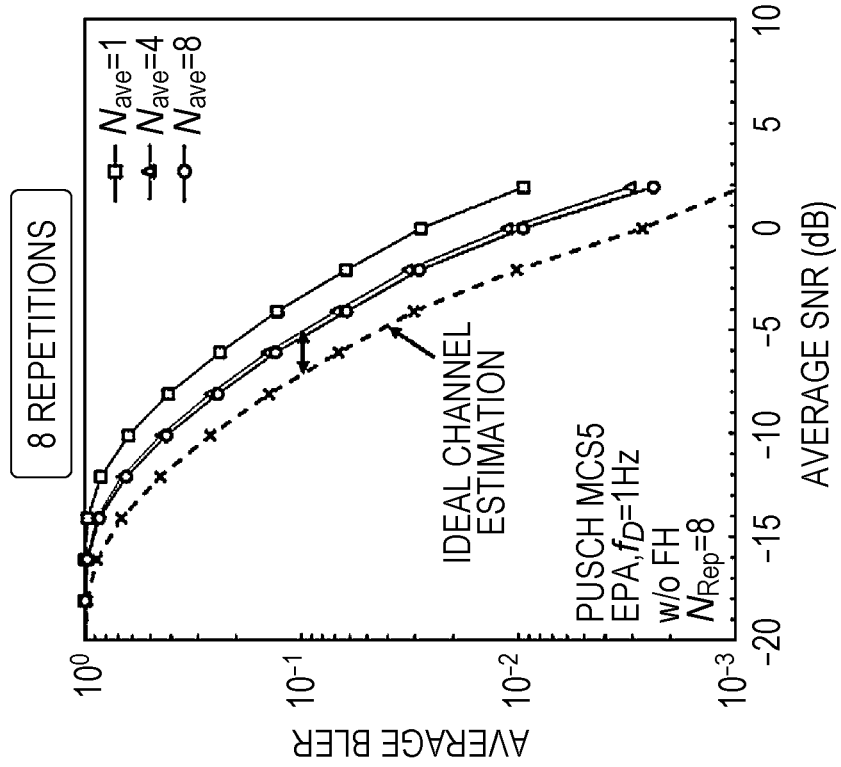

The first observation is based on PUSCH (Physical Uplink Shared Channel) simulation with varying repetition times and the number of subframes combined at the receiver side for demodulation. FIGS. 1A and 1B are schematic diagrams each showing an example of BLER (Block Error Rate) performance of PUSCH repetitions.

As shown in FIGS. 1A and 1B, FIG. 1A on the left and FIG. 1B on the right show simulation curves corresponding to two different repetition cases respectively. In each of them, the horizontal axis represents the average SNR (Signal to Noise Ratio) and the vertical axis represents the average BLER. In the lower left corner of FIG. 1A and the lower right corner of FIG. 1B, simulation parameters are given specifically. Simulation parameters of FIG. 1A and FIG. 1B are same except that repetition time $N_{Rep}$=8 for FIG. 1A and repetition time $N_{Rep}$=128 for FIG. 1B.

Further, as shown in the upper right corner of FIG. 1A and FIG. 1B, a parameter of $N_{ave}$ represents the number of subframes combined in the receiver side for joint channel estimation. Specifically, in FIG. 1A, for a case of 8 repetitions, the curve in dotted line corresponds to the ideal channel estimation and three curves in solid lines correspond to realistic channel estimations when the number of subframes combined in the receiver side to do joint channel estimation equals to 1, 4 and 8 respectively. Similarly, in FIG. 1B, for a case of 128 repetitions, the curve in dotted line corresponds to the ideal channel estimation and three curves in solid lines correspond to realistic channel estimations when the number of subframes combined in the receiver side to do joint channel estimation equals to 1, 4 and 8 respectively.

Intuitively, by comparing FIG. 1A and FIG. 1B, no matter whether the ideal channel estimation or realistic channel estimations, the average SNR of 8 repetitions is much larger than that of 128 repetitions for a same average BLER. Also, the performance gap between the ideal channel estimation curve and realistic channel estimation curves with 4 or 8 subframes combining for the case of 8 repetitions in FIG. 1A is smaller than that for the case of 128 repetitions in FIG. 1B. That is, the performance gap between the ideal channel estimation curve and the realistic channel estimation curves becomes large as the number of repetitions increases.

In particular, when observing the average BLER=$10^{-1}$ as an example, by comparing the ideal channel estimation curve with the curve for the case of $N_{ave}$=8 as indicated by the bidirectional arrow, it can be easily found that the channel estimation gain is only about 1 dB for the case of 8 repetitions as shown in FIG. 1A and reaches up to 6 to 7 dB for the case of 128 repetitions as shown in FIG. 1B. That is to say, the channel estimation gain is quite limited in case of a small repetition time but large in case of a large repetition time.

It is noted that, although the simulation results come from the uplink simulation, the above observation is also valid for downlink cases. Namely, the channel estimation performance improvement will largely increase BLER performance in lower SINR (Signal to Inference plus Noise Ratio) scenario (e.g., as shown in FIG. 1B) but only have a small effect on performance in relatively higher SINR scenario (e.g., as shown in FIG. 1A).

So from the above observation, it is meaningful to increase RS density for a large repetition time or long repetitions (a higher coverage enhancement level) which has relatively lower SINR as shown in FIG. 1B, instead of zero or a small repetition time or no or short repetitions (no or a lower coverage enhancement level) which has relatively higher SINR as shown in FIG. 1A.

The second observation is based on EPDCCH (Enhanced Physical Downlink Control Channel) examples as follows.

As one example, assuming that EPDCCH is transmitted with one PRB which has 120 available REs, DCI (Downlink Control Information) size is 26 bits with CRC (Cyclic Redundancy Check) and modulation is QPSK (Quadrature Phase Shift Keying), equivalent coding rate thereof is around 26/(120×2)=0.108, which is quite low. In that case, in order to increase RS density, some REs assigned for transmitting data signals are usually used for transmitting RS, which seems to have no big impact on the coding rate. For example, using 12 data REs for transmitting RS additionally will make the coding rate changed to 26/((120−12)× 2)=0.120, which is still very low. And the change amount of the coding rate is 0.012, which is also very low.

As another example, assuming EPDCCH is transmitted with one ECCE (Enhanced Control Channel Element) which could carry 36 REs, DCI size is also 26 bits with CRC and modulation is QPSK, equivalent coding rate thereof is 26/(36×2)=0.361, which is relatively high as compared with the above example. In this case, replacing 3 or 6 data REs for RS REs will make the coding rate changed to 26/((36−3)×2)=0.394 or 26/((36−6)×2)=0.433, which is also relatively high as compared with the above example. And, the change amount of the coding rate is 0.033 or 0.072, which is correspondingly high. Thus, replacing 3 or 6 data REs for RS REs would have some impact on BLER performance. In that case, the channel estimation gain resulting from the RS density increase may be smaller than a loss caused by the increased coding rate.

Therefore, from the above observation, it can be found that RS density increase is more reasonable in a case of a low coding rate (e.g., the former example) than a case of a high coding rate (e.g., the latter example), because it has almost no impact on the low coding rate but UE (User Equipment) can benefit from the channel estimation performance improvement resulting from the RS density increase.

It is noted that, although the results of the above observation are based on downlink examples, the above observation is also valid for uplink cases.

Based on the above two observations, we need to consider in which conditions the RS density increase is meaningful when adopting the RS density increase, so as to maximally optimize system performance.

Figure 2:
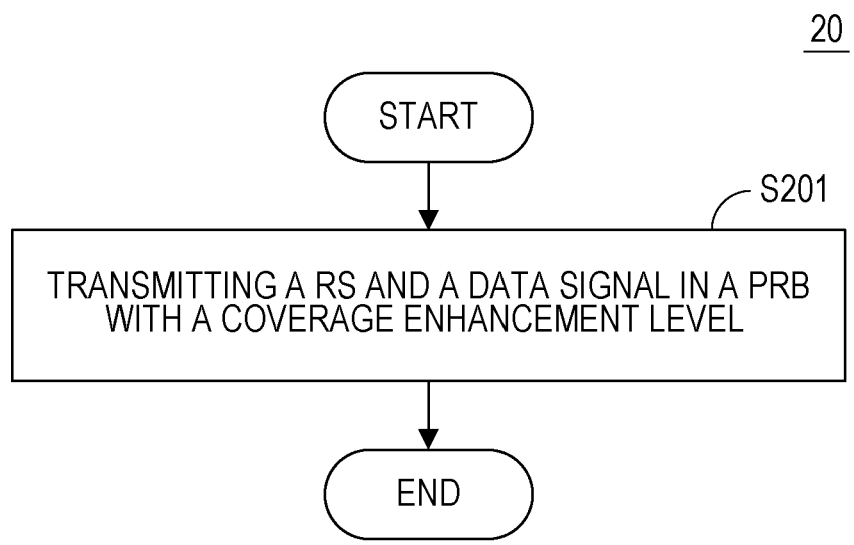
FIG. 2 is a flowchart of a wireless communication method according to an embodiment of the present disclosure.

In an embodiment of the present disclosure, there is provided a wireless communication method 20 as shown in FIG. 2. FIG. 2 is a flowchart of a wireless communication method according to an embodiment of the present disclosure. As shown in FIG. 2, the wireless communication method 20 includes a step S201 of transmitting a reference signal and a data signal in a PRB with a coverage enhancement level. In the wireless communication method 20, the number of resource elements transmitting the reference signal in the PRB is determined by the coverage enhancement level, the channel type and/or the coding rate of the data signal.

Specifically, as described above, one PRB includes 12×14 REs in total, some of which are assigned for transmitting the reference signal (RS) and another some of which are used for transmitting the data signal. For example, the RS may be a DMRS which is used to demodulate the transmitted signals containing the data in a UE (receiver side). However, the RS is not limited to a certain RS such as DMRS and may be all kinds of RSs. For example, when the wireless communication method 20 is used in MTC, the RS may be a CRS.

Furthermore, for example, in MTC with coverage enhancement, a coverage enhancement level is defined to indicate the level or degree of coverage enhancement. The higher the coverage enhancement level is, the larger the coverage enhancement is. In more particular, when employing repetitions to implement coverage enhancement, the coverage enhancement level may also be represented by the repetition time. That is to say, the more the repetition time employed is, the larger the coverage enhancement is and thus the higher the coverage enhancement level is.

In addition, with respect to repetitions, it is well known that the repetition time may indicate the time the RS and the data signal are transmitted repeatedly in subframes or in PRBs. One subframe consists of two slots, each of them contains 7 symbols in time domain, which is same as one PRB. However, one PRB corresponds to 12 subcarriers in frequency domain, and one subframe depends on the bandwidth in frequency domain. Thus, repetition in subframes means repetition in time domain only and repetition in PRBs means repetition in both time domain and frequency domain. It is noted that, although not exemplified here, repetition may also be implemented in frequency domain only.

Thus, according to an embodiment of the present disclosure, in the wireless communication 20, the coverage enhancement level may be represented by the repetition time of transmission of the reference signal and the data signal in time domain and/or in frequency domain.

Note that, the repetition as one of key techniques for coverage enhancement is only for illustration, the techniques for coverage enhancement are not limited to the repetition, and other techniques may be used to implement coverage enhancement. When employing other techniques, the coverage enhancement level may be represented by other parameters instead of the repetition time.

Further, the wireless communication method 20 is suitable for MTC, but not limited to MTC. It can be applied to any wireless communication with coverage enhancement.

As described above, the number of REs transmitting the RS in the PRB may be determined by the coverage enhancement level, the channel type and/or the coding rate of the data signal. That is, one of or any combination of the three parameters are used to implement RS density increase. The details of the three parameters will be discussed later.

With the wireless communication 20, by increasing RS density based on the coverage enhancement level, the channel type and/or the coding rate of the data signal, signal quality is improved and the power consumption for UEs with coverage enhancement is reduced.

According to an embodiment of the present disclosure, in the wireless communication 20 as shown in FIG. 2, the number of resource elements transmitting the reference signal in the PRB for a larger coverage enhancement level may be more than that for a smaller coverage enhancement level.

Specifically, as found in the first observation above, since the communication with a larger coverage enhancement level (e.g., a larger repetition time) has relatively low SINR as shown in FIG. 1B and the channel estimation performance improvement will largely increase its BLER performance, it is meaningful to increase RS density in this case, that is, more RS REs in the PRB should be used for transmitting the RS. Meanwhile, the communication with a smaller coverage enhancement level (e.g., a smaller repetition time) has relatively higher SINR as shown in FIG. 1A and the channel estimation performance improvement only have small effect on its BLER performance, it is meaningless to increase RS density in this case, that is, less RS REs in the PRB should be used for transmitting the RS.

In order for those skilled to understand more easily, PDSCH (Physical Downlink Shared Channel) is taken as an example. In the following, Table 1 shows an exemplary usage of REs for transmitting the RS in the PRB based on the coverage enhancement level.

TABLE 1

| | Coverage Enhancement Level | | | | |
|---|---|---|---|---|---|
| | 1 | 2 | 3 | 4 | 5 |
| RS Configuration | One or two DMRS ports: 12 REs | Two or four DMRS ports: 24 REs | DMRS (two or four ports, 24 REs) + CRS (two ports, 16 REs) = 40 REs | DMRS (two or four ports, 24 REs) + CRS (four ports, 24 REs) = 48 REs | Maximum DMRS REs + maximum CRS REs + CSI-RS REs > 48 REs |

In Table 1, the first line gives five different coverage enhancement levels 1-5 and the second line shows RS configurations corresponding to the coverage enhancement levels 1-5, respectively. Here, it is assumed that the coverage enhancement level 1 indicates the smallest level (e.g., the smallest repetition times) and the coverage enhancement level 5 indicates the largest level (e.g., the largest repetition times).

In a case of the smallest coverage enhancement level 1, the smallest number of REs in the PRB is used for transmitting the RS, that is, the smallest RS density is employed since there is potentially no channel estimation gain resulting from RS density increase in this scenario as discussed previously. For example, as shown in Table 1, one or two DMRS ports, i.e., 12 DMRS REs, may be used as RS REs here.

In a case of the coverage enhancement level 2 which is larger than the smallest coverage enhancement level 1, the number of REs for transmitting the RS in the PRB may be increased from the case of the smallest coverage enhancement level 1. For example, as shown in Table 1, two or four DMRS ports, i.e., 24 DMRS REs, may be used as RS REs here. 24 DMRS REs is the maximum DMRS RE configuration.

In a case of the coverage enhancement level 3 which is larger than the coverage enhancement level 2, the number of REs for transmitting the RS in the PRB may be further increased from the case of the coverage enhancement level 2. For example, as shown in Table 1, in addition to two or four DMRS ports, i.e., 24 DMRS REs, two CRS ports, i.e., 16 CRS REs, may be used as RS REs here. That is to say, there are 40 RS REs in total in the PRB in this case.

In a case of the coverage enhancement level 4 which is larger than the coverage enhancement level 3, the number of REs for transmitting the RS in the PRB may be further increased from the case of the coverage enhancement level 3. For example, as shown in Table 1, two or four DMRS ports, i.e., 24 DMRS REs, as well as four CRS ports, i.e., 24 CRS REs, may be used as RS REs here. That is to say, there are 48 RS REs in total in the PRB in this case. 24 CRS REs is the maximum CRS RE configuration.

In a case of the largest coverage enhancement level 5, the number of REs for transmitting the RS in the PRB may be further increased from the case of the coverage enhancement level 4. For example, as shown in Table 1, in addition to the maximum DMRS RE configuration, i.e., 24 DMRS REs, as well as the maximum CRS RE configuration, i.e., 24 CRS REs, REs assigned for another RS such as CSI-RS (Channel State Information Reference Signal) may be used as RS REs here. That is to say, there are more than 48 RS REs in total in the PRB in this case.

With the RS configuration based on the coverage enhancement level in Table 1, UE which cannot benefit from RS density increase will have no performance loss.

It is noted that, the classification of coverage enhancement levels and corresponding RS configurations in Table 1 are only for the purpose of illustration, and the present disclosure is not limited thereto. The classification of coverage enhancement levels and corresponding RS configurations may be varied depending on specific practice.

Further, although determination of the number of RS REs in a PRB based on the coverage enhancement level is explained specifically taking PDSCH as an example, the present disclosure is not limited thereto. The present disclosure is also suitable for 15 PUSCH for example, and is even applicable to any kinds of downlinks and uplinks.

By determining the number of RS REs in a PRB based on the coverage enhancement level, the wireless communication 20 can avoid increasing RS density unnecessarily and impacting original performance for UEs with a smaller coverage enhancement level due to increased overhead and coding rate.

According to an embodiment of the present disclosure, in the wireless communication 20 as shown in FIG. 2, at least a part of the reference signal transmitted in the PRB may reuse existing CRS, DMRS, CSI-RS and/or other existing reference signals.

Reusing these existing RSs means not only using REs assigned for transmitting these existing RSs in the PRB but also using these signals for channel estimation. Specifically, RE configurations in a PRB for legacy RSs such as CRS, DMRS, CSI-RS and the like are predefined in the standard. These legacy RSs can be reused for increasing RS density.

For a MTC UE for example, depending on the specific requirement of RS density increase, the RS used for MTC may reuse existing CRS, DMRS, CSI-RS, that is, REs for transmitting the RS for MTC in the PRB may directly apply CRS REs, DMRS REs, CSI-RS REs and so on. For example, as shown in Table 1, for the coverage enhancement levels 1 and 2, DMRS is reused. When it is required to increase RS density for the coverage enhancement levels 3 and 4, CRS is additionally reused. When it is required to further increase RS density for the coverage enhancement level 5, DMRS, CRS and CSI-RS are all reused. In addition to REs of legacy RS, signals of these legacy RSs may be directly used for the MTC.

By reusing legacy RSs for the RS in the wireless communication 20, existing RSs could be utilized as much as possible and increasing many additional RS REs is avoided, thus the resource utilization ratio is guaranteed.

According to an embodiment of the present disclosure, in the wireless communication 20 as shown in FIG. 2, at least a part of the reference signal transmitted in the PRB may be transmitted in resource elements used for transmitting the data signal.

Specifically, when legacy RSs cannot be used for MTC for example, some REs assigned for transmitting the data signals can be used for the RS. For example, it is assumed that only DMRS REs are available for PDSCH case in Table 1. Accordingly, in case of the coverage enhancement level 3, in addition to the maximum DMRS RE configuration, i.e., 24 DMRS REs, 16 REs assigned for transmitting data signals may be used now for transmitting the RS instead of CRS REs. The cases of the coverage enhancement levels 4 and 5 will be similar with the case of the coverage enhancement level 3.

Therefore, based on the availability of legacy RSs and the number of RS REs to be increased, all of the RS may reuse legacy RSs, a part of the RS may reuse legacy RSs and the rest of the RS may be transmitted in some data REs in the PRB, or all of the RS may be transmitted in some data REs in the PRB.

According to an embodiment of the present disclosure, in the wireless communication as shown in FIG. 2, the number of resource elements transmitting the reference signal in the PRB for a higher coding rate is less than that for a lower coding rate.

Specifically, as found in the second observation above, since there is almost no impact on a low coding rate when increasing RS density, RS density increase is more reasonable in a case of a low coding rate than a case of a high coding rate. That is to say, more RS REs in the PRB should be used for transmitting the RS in a case of a low coding rate, meanwhile less RS REs in the PRB should be used for transmitting the RS in a case of a high coding rate.

By determining the number of RS REs in a PRB based on the coding rate, the wireless communication 20 can avoid increasing RS density unnecessarily and causing performance loss to UEs with a high coding rate.

According to an embodiment of the present disclosure, in the wireless communication 20 as shown in FIG. 2, the data signal may be used for transmitting PDSCH or PUSCH, and the usage of resource elements for transmitting the reference signal in the PRB may be indicated by MCS indicated in DCI, which is transmitted in Physical Downlink Control Channel (PDCCH) or EPDCCH.

Specifically, in order for those skilled to understand more easily, PDSCH is still taken as an example in which it is assumed that PDSCH is transmitted with one PRB with 120 available REs, and the modulation is QPSK. The usage (configuration) of RS in this case may be indicated in MCS which is indicated in DCI transmitted in PDCCH or EPDCCH. In the following, Table 2 shows an example of RS density increase based on the coding rate indicated by MCS (Modulation and Coding Scheme).

TABLE 2

| MCS Index | Modulation Order | TBS Index | Coding Rate | Increased Number of RS REs |
|---|---|---|---|---|
| 0 | 2 | 0 | 0.067 | 24 REs |
| 1 | 2 | 1 | 0.1 | 24 REs |
| 2 | 2 | 2 | 0.134 | 24 REs |
| 4 | 2 | 4 | 0.233 | 12 REs |
| 3 | 2 | 3 | 0.167 | 12 REs |
| 5 | 2 | 5 | 0.3 | 12 REs |
| 6 | 2 | 6 | N/A | 0 |
| 7 | 2 | 7 | 0.433 | 0 |
| 8 | 2 | 8 | 0.5 | 0 |
| 9 | 2 | 9 | 0.567 | 0 |

In Table 2, the first column lists out MCS indices 0-9, and the second column gives the modulation order which equals to 2 for QPSK here. Further, the third column shows TBS (Transport Block Size) indices 0-9 which correspond to MCS indices 0-9 of the first column one by one and respectively indicates different sizes of data, i.e., different numbers of bits of data. Based on the number of bits indicated by each TBS index as well as conditions assumed above, the corresponding coding rate of each TBS index may be calculated through the same computation method as that in the second observation above. The fourth column gives the calculated coding rates respectively corresponding to TBS indices 0-9. For example, TBS index 0 and MCS index 0 correspond to a coding rate of 0.067, TBS index 1 and MCS index 1 correspond to a coding rate of 0.1, TBS index 2 and MCS index 2 correspond to a coding rate of 0.134, TBS index 3 and MCS index 3 correspond to a coding rate of 0.167, TBS index 4 and MCS index 4 correspond to a coding rate of 0.233, TBS index 5 and MCS index 5 correspond to a coding rate of 0.3, TBS index 6 and MCS index 6 correspond to a coding rate of N/A, TBS index 7 and MCS index 7 correspond to a coding rate of 0.433, TBS index 8 and MCS index 8 correspond to a coding rate of 0.5, and TBS index 9 and MCS index 9 correspond to a coding rate of 0.567.

Based on the above discussion, the number of RS REs in the PRB for a higher coding rate should be less than that for a lower coding rate since the RS density increase hardly impact the lower coding rate and UE can benefit from the channel estimation improvement resulting from the RS density increase without suffering from increased coding rate.

In Table 2, the fifth column gives increased number of RS REs in different cases. Specifically, in cases of low coding rates of 0.067, 0.1 and 0.134 respectively indicated by MCS index 0, 1 and 2, largest RE density increase is employed, i.e., 24 REs are added for transmitting the RS in the PRB. In cases of medium coding rates of 0.167, 0.233 and 0.3 respectively indicated by MCS index 3, 4 and 5, medium RE density increase is employed, i.e., 12 REs are added for transmitting the RS in the PRB. In cases of large coding rates of N/A, 0.433, 0.5 and 0.567 respectively indicated by MCS index 6, 7, 8 and 9, RE density increase is not employed, i.e., no RE is added for transmitting the RS in the PRB. Thus, the usage of REs for transmitting the RS (or the RS density increase) in the PRB can be indicated by MCS as shown in Table 2.

Note that, the increased number of RS REs (e.g., 24 or 12 REs) in Table 2 is only for the purpose of illustration and the present disclosure is not limited thereto. Further, although PDSCH is taken as an example here, the present disclosure is not limited thereto. The present disclosure is also suitable for PUSCH for example, and is even applicable to any kinds of downlink and uplink data.

In addition, as discussed before, the added 24 or 12 REs in this example may reuse legacy RSs, may be transmitted in some data REs in the PRB, or may partially reuse legacy RSs and partially be transmitted in some data REs in the PRB.

By indicating the usage of REs for transmitting the RS in the PRB by MCS, there is no need to set a new signaling to indicate the RS usage.

According to an embodiment of the present disclosure, in the wireless communication 20 as shown in FIG. 2, the usage of resource elements transmitting the reference signal in the PRB may be configured by Radio Resource Control (RRC), may be predefined or may be recommended by a user equipment through Channel Quality Indicator (CQI).

Specifically, although an example that the usage of REs for transmitting the RS in the PRB is indicated by MCS is given above, the present disclosure is not limited thereto. The detailed usage of increased RS REs may also be configured by RRC or predefined. Alternatively, UE may also recommend the RS density increase through CQI. Since RRC and CQI are existing signaling like MCS and configurations thereof are well known to those skilled in the art, no more details thereof will be discussed here for avoiding redundancy. Similarly, there is no need to set a new signaling to indicate the RS usage in this case.

As mentioned previously, the number of REs transmitting the RS in the PRB may be determined by the channel type of the data signal. That is to say, different channel may use different RS density.

According to an embodiment of the present disclosure, in the wireless communication 20 as shown in FIG. 2, the data signal may be used for transmitting PDCCH or EPDCCH, and the usage of resources elements transmitting the reference signal in the PRB may be indicated by SIB (System Information Block) or may be specified.

Specifically, PDCCH and PDSCH are taken as an example. In general, it is assumed that PDCCH has a quite low coding rate, for example, uses one PRB to transmit DCI of 26 bits, but PDSCH uses a relatively high coding rate so as to guarantee the throughput. In this case, PDSCH usually use a normal RS density while PDCCH may use increased RS density. Thus, the channel performance of PDSCH will not be impacted. Meanwhile, PDCCH almost has no performance loss as well but can benefit from the channel estimation performance improvement resulting from the RS density increase.

In addition, the detailed usage of RS REs for PDCCH may be indicated by SIB. Alternatively, the detailed usage of RS REs for PDCCH may be specified for example in specification. For example, for the purpose of simplicity, the maximum RS density (e.g., 24 CRS REs plus 24 DMRS REs) may be always assumed for PDCCH. In this way, there is no need to set a new signaling to indicate the detailed usage of RS REs for PDCCH.

Although PDCCH and PDSCH are taken as an example here, the present disclosure is not limited thereto and the above design is also suitable for EPDCCH for example.

According to an embodiment of the present disclosure, in the wireless communication 20 as shown in FIG. 2, the data signal may be used for transmitting SIB1, and the usage of resource elements transmitting the reference signal in the PRB may be indicated by Master Information Block (MIB) or may be specified.

Specifically, SIBs are taken as an example. It is well known that UE has no knowledge of the coverage enhancement level before or during SIB reception. In this case, it is impossible to determine the RS density increase for SIB1 based on the coverage enhancement level before reception and demodulation of SIB1. Thus, when transmitting the SIB1 in a PRB, the usage of REs for transmitting the RS may be specified in specification. For example, maximum RS density (e.g., 24 CRS REs plus 24 DMRS REs) may be always assumed for SIB1.

Alternatively, the usage of REs for transmitting the RS for SIB1 may also be indicated in MIB. In this case, MIB is firstly demodulated at the receiver side so that the usage of REs for transmitting the RS for SIB1 indicated in MIB can be obtained for demodulation of SIB1. Then, SIB1 is demodulated at the receiver side.

By indicating the usage of RS REs in the PRB for SIB1 by MIB or specifying it, there is no need to set a new signaling to indicate the detailed usage of RS REs for SIB1.

According to an embodiment of the present disclosure, in the wireless communication 20 as shown in FIG. 2, the usages of resource elements transmitting reference signals in PRBs for other SIBs are indicated by SIB1.

Specifically, since other SIBs are obtained after SIB1, the usages of RS REs in PRBs for other SIBs may be indicated by SIB1. In this way, after SIB1 is received at the receiver side, the usages of RS REs in PRBs for other SIBs indicated by SIB1 can be obtained for decoding other SIBs. Then, other SIBs can be obtained at the receiver side.

By indicating usages of RS REs in PRBs for other SIBs by SIB1, more flexibility of RS usage of SIBs is realized.

Figure 3:
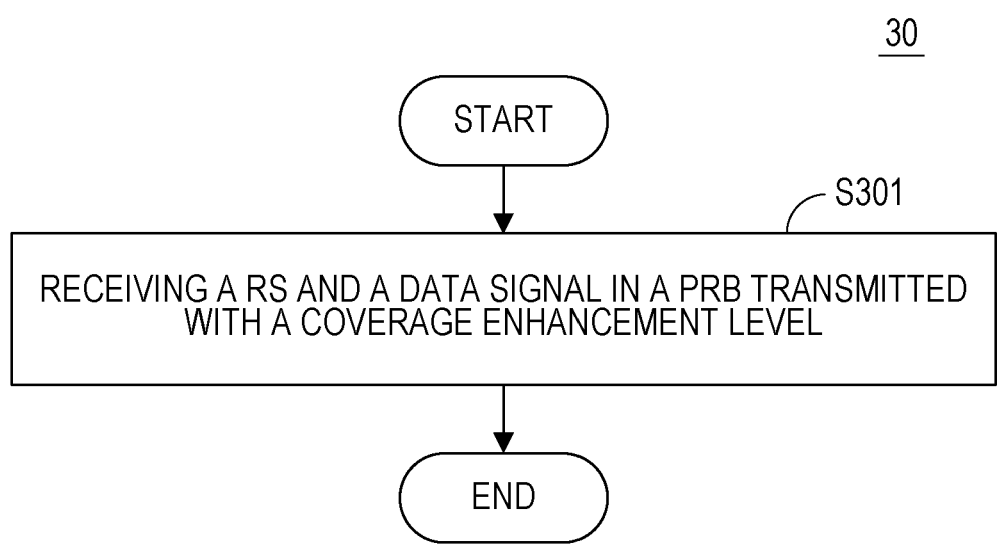
FIG. 3 is a flowchart of a wireless communication method according to another embodiment of the present disclosure.

In another embodiment of the present disclosure, there is provided a wireless communication method 30 as shown in FIG. 3. FIG. 3 is a flowchart of a wireless communication method according to another embodiment of the present disclosure. As shown in FIG. 3, the wireless communication method 30 includes a step S301 of receiving a reference signal and a data signal in a PRB transmitted with a coverage enhancement level. In the wireless communication method 30, the number of resource elements transmitting the reference signal in the PRB is determined by the coverage enhancement level, the channel type and/or the coding rate of the data signal.

With the wireless communication 30, by increasing RS density based on the coverage enhancement level, the channel type and/or the coding rate of the data signal, signal quality is improved and the power consumption for UEs with coverage enhancement is reduced.

According to an embodiment of the present disclosure, in the wireless communication 30 as shown in FIG. 3, the number of resource elements transmitting the reference signal in the PRB for a larger coverage enhancement level is more than that for a smaller coverage enhancement level.

According to an embodiment of the present disclosure, in the wireless communication 30 as shown in FIG. 3, the number of resource elements transmitting the reference signal in the PRB for a higher coding rate is less than that for a lower coding rate.

Note that, the other technical features in the above wireless communication method 20 can also be incorporated in the wireless communication device 30.

Figure 4:
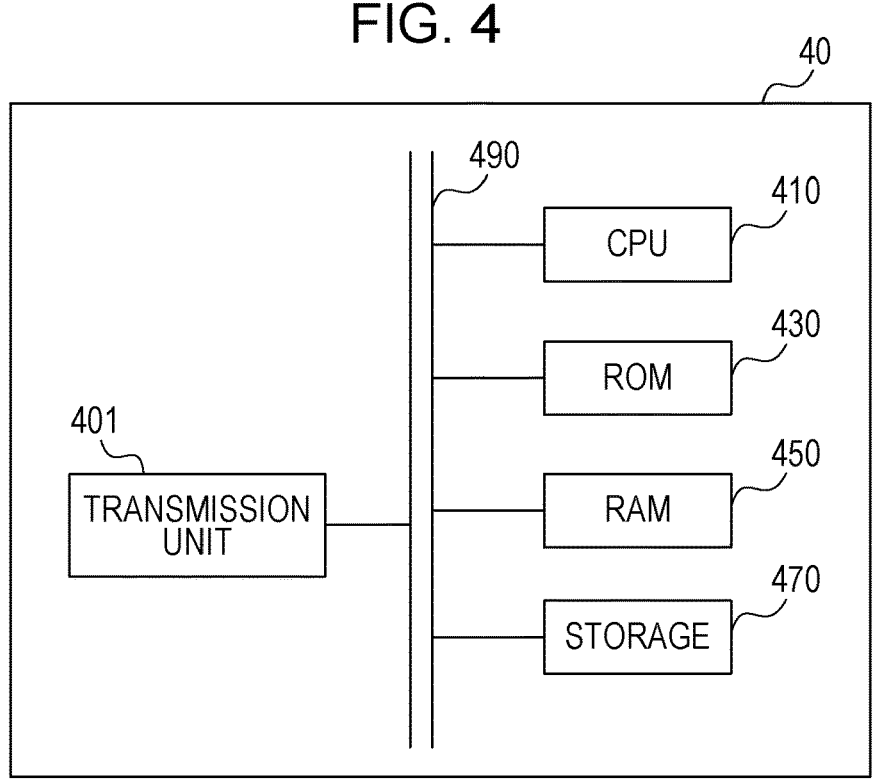
FIG. 4 is a block diagram showing a wireless communication device according to a further embodiment of the present disclosure.

In a further embodiment of the present disclosure, there is provided a wireless communication device 40 as shown in FIG. 4. FIG. 4 is a block diagram showing the wireless communication device 40 according to a further embodiment of the present disclosure.

As shown in FIG. 4, the wireless communication device 40 includes a transmission unit 401 configured to transmit a reference signal and a data signal in a PRB with a coverage enhancement level. The number of resource elements transmitting the reference signal in the PRB is determined by the coverage enhancement level, the channel type and/or the coding rate of the data signal.

The wireless communication device 40 according to the present embodiment may further include a CPU (Central Processing Unit) 410 for executing related programs to process various data and control operations of respective units in the wireless communication device 40, a ROM (Read Only Memory) 430 for storing various programs required for performing various process and control by the CPU 410, a RAM (Random Access Memory) 450 for storing intermediate data temporarily produced in the procedure of process and control by the CPU 410, and/or a storage unit 470 for storing various programs, data and so on. The above transmission unit 401, CPU 410, ROM 430, RAM 450 and/or storage unit 470 etc. may be interconnected via data and/or command bus 490 and transfer signals between one another.

Respective units as described above do not limit the scope of the present disclosure. According to one embodiment of the disclosure, the function of the above transmission unit 401 may also be implemented by functional software in combination with the above CPU 410, ROM 430, RAM 450 and/or storage unit 470 etc.

With the wireless communication device 40, by increasing RS density based on the coverage enhancement level, the channel type and/or the coding rate of the data signal, signal quality is improved and the power consumption for UEs with coverage enhancement is reduced.

Figure 5:
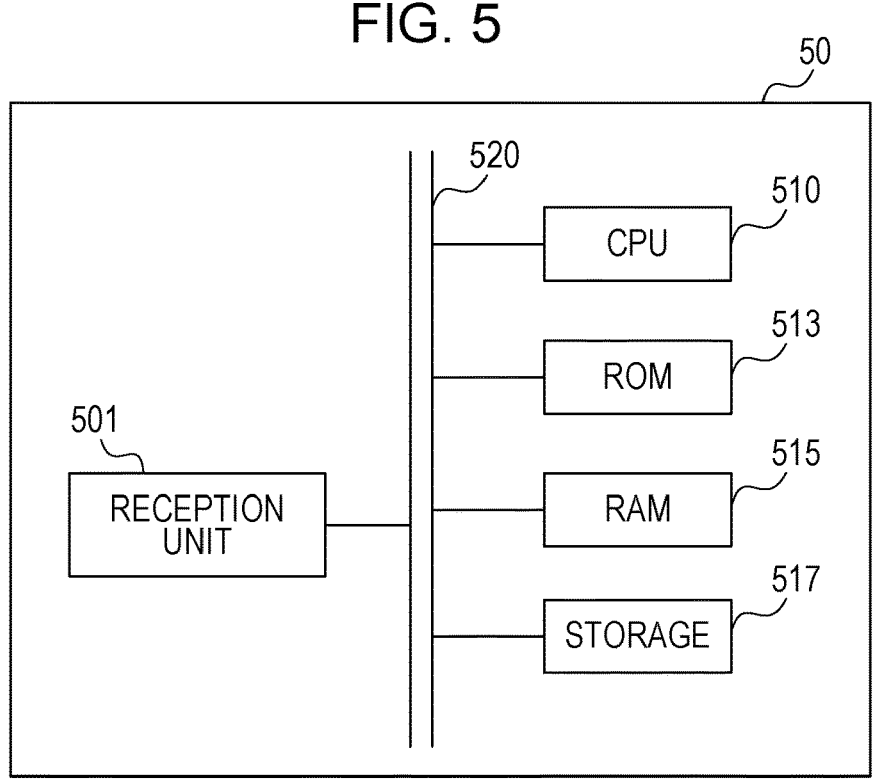
FIG. 5 is a block diagram showing a wireless communication device according to a still further embodiment of the present disclosure.

In a still further embodiment of the present disclosure, there is provided a wireless communication device 50 as shown in FIG. 5. FIG. 5 is a block diagram showing the wireless communication device 50 according to a still further embodiment of the present disclosure.

As shown in FIG. 5, the wireless communication device 50 includes a reception unit 501 configured to receive a reference signal and a data signal in a PRB transmitted with a coverage enhancement level. The number of resource elements transmitting the reference signal in the PRB is determined by the coverage enhancement level, the channel type and/or the coding rate of the data signal.

The wireless communication device 50 according to the present embodiment may further include a CPU 510 for executing related programs to process various data and control operations of respective units in the wireless communication device 50, a ROM 513 for storing various programs required for performing various process and control by the CPU 510, a RAM 515 for storing intermediate data temporarily produced in the procedure of process and control by the CPU 510, and/or a storage unit 517 for storing various programs, data and so on. The above reception unit 501, CPU 510, ROM 513, RAM 515 and/or storage unit 517 etc. may be interconnected via data and/or command bus 520 and transfer signals between one another.

Respective units as described above do not limit the scope of the present disclosure. According to one embodiment of the disclosure, the function of the above reception unit 501 may also be implemented by functional software in combination with the above CPU 510, ROM 513, RAM 515 and/or storage unit 517 etc.

With the wireless communication device 50, by increasing RS density based on the coverage enhancement level, the channel type and/or the coding rate of the data signal, signal quality is improved and the power consumption for UEs with coverage enhancement is reduced.

Note that, the wireless communication device 40 and the wireless communication device 50 can be an eNB (eNodeB), a UE or the like depending on specific application scenarios. Further, the technical features in the above wireless communication methods 20 and 30 can also be incorporated in the above wireless communication devices 40 and 50 respectively.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A wireless communication method comprising:
transmitting a reference signal and a data signal in a Physical Resource Block (PRB) with a coverage enhancement level, wherein
the number of resource elements transmitting the reference signal in the PRB is determined by the coverage enhancement level, the channel type and/or the coding rate of the data signal.

(2). The method according to (1), wherein the number of resource elements transmitting the reference signal in the PRB for a larger coverage enhancement level is more than that for a smaller coverage enhancement level.

(3). The method according to (1), wherein at least a part of the reference signal transmitted in the PRB reuses existing Cell-specific Reference Signal (CRS), Demodulation Reference Signal (DMRS), Channel State Information Reference Signal (CSI-RS) and/or other existing reference signals.

(4). The method according to (1), wherein at least a part of the reference signal transmitted in the PRB is transmitted in resource elements used for transmitting the data signal.

(5). The method according to (1), wherein the number of resource elements transmitting the reference signal in the PRB for a higher coding rate is less than that for a lower coding rate.

(6). The method according to (1), wherein the data signal is used for transmitting Physical Downlink Shared Channel (PDSCH) or Physical Uplink Shared Channel (PUSCH), and the usage of resource elements for transmitting the reference signal in the PRB is indicated by Modulation and Coding Scheme (MCS) indicated in Downlink Control Information (DCI), which is transmitted in Physical Downlink Control Channel (PDCCH) or Enhanced Physical Downlink Control Channel (EPDCCH).

(7). The method according to (1), wherein the usage of resource elements transmitting the reference signal in the PRB is configured by Radio Resource Control (RRC), is predefined or is recommended by user equipment through Channel Quality Indicator (CQI).

(8). The method according to (1), wherein the data signal is used for transmitting PDCCH or EPDCCH, and the usage of resources elements transmitting the reference signal in the PRB is indicated by System Information Block (SIB) or is specified.

(9). The method according to (1), wherein the data signal is used for transmitting SIB1, and the usage of resource elements transmitting the reference signal in the PRB is indicated by Master Information Block (MIB) or is specified.

(10). The method according to (1), wherein the usages of resource elements transmitting reference signals in PRBs for other SIBs are indicated by SIB1.

(11). A wireless communication method comprising:
receiving a reference signal and a data signal in a Physical Resource Block (PRB) transmitted with a coverage enhancement level, wherein
the number of resource elements transmitting the reference signal in the PRB is determined by the coverage enhancement level, the channel type and/or the coding rate of the data signal.

(12). The method according to (11), wherein the number of resource elements transmitting the reference signal in the PRB for a larger coverage enhancement level is more than that for a smaller coverage enhancement level.

(13). The method according to (11), wherein the number of resource elements transmitting the reference signal in the PRB for a higher coding rate is less than that for a lower coding rate.

(14). A wireless communication device comprising:
a transmission unit configured to transmit a reference signal and a data signal in a Physical Resource Block (PRB) with a coverage enhancement level, wherein
the number of resource elements transmitting the reference signal in the PRB is determined by the coverage enhancement level, the channel type and/or the coding rate of the data signal.

(15). A wireless communication device comprising:
a reception unit configured to receive a reference signal and a data signal in a Physical Resource Block (PRB) transmitted with a coverage enhancement level, wherein
the number of resource elements transmitting the reference signal in the PRB is determined by the coverage enhancement level, the channel type and/or the coding rate of the data signal.

(16). The method according to (1), wherein the coverage enhancement level is represented by the repetition time of transmission of the reference signal and the data signal in time domain and/or in frequency domain.

It is noted that the technical features in the above wireless communication methods can also be incorporated in the above wireless communication devices. In addition, embodiments of the present disclosure can also provide an integrated circuit which comprises module(s) for performing the step(s) in the above respective wireless communication methods. Further, embodiments of the present can also provide a computer readable storage medium having stored thereon a computer program containing a program code which, when executed on a computing device, performs the step(s) of the above respective wireless communication methods.

What is claimed is:
1. A wireless communication method comprising:
identifying resource elements used to transmit a reference signal in a Physical Resource Block (PRB);
transmitting the reference signal and a data signal in the PRB, based on a coverage enhancement level represented by a number of transmission repetitions; and
determining a number of the resource elements used to transmit the reference signal in the PRB by one or more of the coverage enhancement level, a channel type, and a coding rate of the data signal, wherein:
the data signal is used to transmit a Physical Downlink Control Channel (PDCCH) or an Enhanced PDCCH (EPDCCH), usage of the resource elements used to transmit the reference signal in the PRB is indicated by a System Information Block (SIB) or is specified, and the reference signal is a Cell-specific Reference Signal (CRS) or a Demodulation Reference Signal (DMRS).

2. The method according to claim 1, wherein the number of the resource elements used to transmit the reference signal in the PRB for a larger coverage enhancement level is more than that for a smaller coverage enhancement level.

3. The method according to claim 1, wherein the number of the resource elements used to transmit the reference signal in the PRB is different from the channel type.

4. The method according to claim 1, wherein the reference signal density of the PDCCH is higher than a reference signal density of a Physical Uplink Shared Channel (PDSCH).

5. The method according to claim 1, wherein at least part of the reference signal transmitted in the PRB is transmitted in resource elements used to transmit the data signal.

6. The method according to claim 1, wherein the number of the resource elements used to transmit the reference signal in the PRB for a higher coding rate is less than that for a lower coding rate.

7. The method according to claim 1, wherein the data signal is used to transmit a Physical Downlink Shared Channel (PDSCH) or a Physical Uplink Shared Channel (PUSCH), and the usage of the resource elements used to transmit the reference signal in the PRB is indicated by a Modulation and Coding Scheme (MCS) indicated in Downlink Control Information (DCI), which is transmitted in the PDCCH or the EPDCCH.

8. The method according to claim 1, wherein the usage of the resource elements used to transmit the reference signal in the PRB is configured by Radio Resource Control (RRC), is predefined, or is recommended by user equipment through a Channel Quality Indicator (CQI).

9. A wireless communication device comprising:
a transmitter which, in operation, transmits a reference signal and a data signal in a Physical Resource Block (PRB), based on a coverage enhancement level represented by a number of transmission repetitions; and
circuitry which, in operation, determines a number of resource elements used to transmit the reference signal in the PRB by one or more of the coverage enhancement level, a channel type, and a coding rate of the data signal, wherein:
the data signal is used for used to transmit a Physical Downlink Control Channel (PDCCH) or an Enhanced PDCCH (EPDCCH), usage of the resource elements used to transmit the reference signal in the PRB is indicated by a System Information Block (SIB) or is specified, and the reference signal is a Cell-specific Reference Signal (CRS) or a Demodulation Reference Signal (DMRS).

10. The wireless communication device according to claim 9, wherein the number of the resource elements used to transmit the reference signal in the PRB for a larger coverage enhancement level is more than that for a smaller coverage enhancement level.

11. The wireless communication device according to claim 9, wherein the number of the resource elements used to transmit the reference signal in the PRB is different from the channel type.

12. The wireless communication device according to claim 9, wherein a reference signal density of the PDCCH is higher than a reference signal density of a Physical Uplink Shared Channel (PDSCH).

13. The wireless communication device according to claim 9, wherein at least part of the reference signal transmitted in the PRB is transmitted in resource elements used to transmit the data signal.

14. The wireless communication device according to claim 9, wherein the number of the resource elements used to transmit the reference signal in the PRB for a higher coding rate is less than that for a lower coding rate.

15. The method according to claim 9, wherein the data signal is used to transmit a Physical Downlink Shared Channel (PDSCH) or a Physical Uplink Shared Channel (PUSCH), and the usage of the resource elements used to transmit the reference signal in the PRB is indicated by a Modulation and Coding Scheme (MCS) indicated in Downlink Control Information (DCI), which is transmitted in the PDCCH or the EPDCCH.

16. The method according to claim 9, wherein the usage of the resource elements used to transmit the reference signal in the PRB is configured by Radio Resource Control (RRC), is predefined, or is recommended by user equipment through a Channel Quality Indicator (CQI).

* * * * *